Nov. 29, 1960     G. J. MIHAL ET AL     2,962,107
PROTECTIVE ELEMENT FOR TRACTOR RADIATOR AND MOUNTING THEREFOR
Filed May 9, 1958     3 Sheets-Sheet 1

INVENTORS
G. J. MIHAL
W. W. McCAW

Nov. 29, 1960 G. J. MIHAL ET AL 2,962,107
PROTECTIVE ELEMENT FOR TRACTOR RADIATOR AND MOUNTING THEREFOR
Filed May 9, 1958 3 Sheets-Sheet 2

INVENTORS
G. J. MIHAL
W. W. McCAW

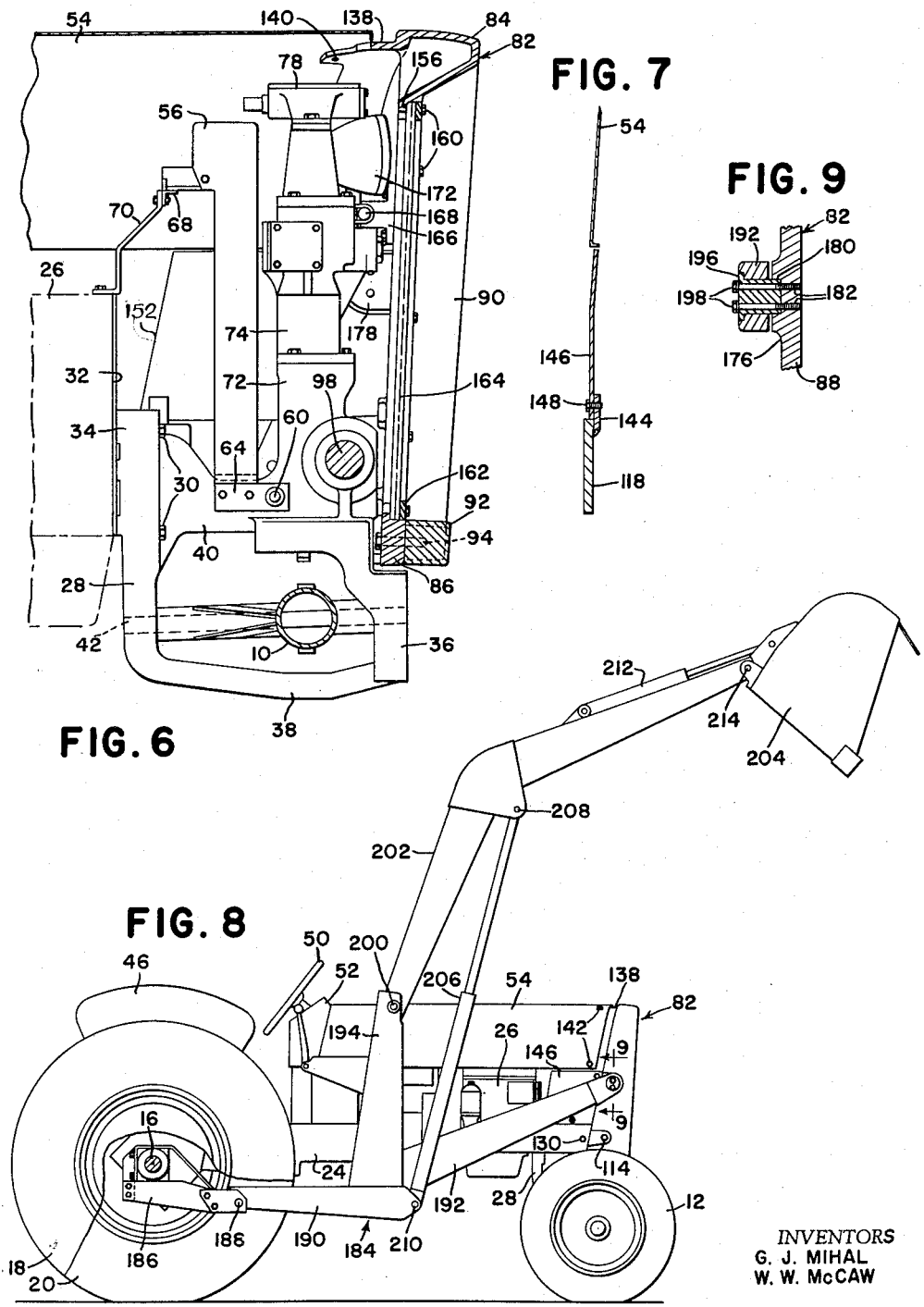

United States Patent Office 2,962,107
Patented Nov. 29, 1960

2,962,107

PROTECTIVE ELEMENT FOR TRACTOR RADIATOR AND MOUNTING THEREFOR

Gust J. Mihal and Warren W. McCaw, Dubuque, Iowa, assignors, by mesne assignments, to Deere & Company, a corporation of Delaware Filed May 9, 1958, Ser. No. 734,198

5 Claims. (Cl. 180—68)

This invention relates to a vehicle and more especially to a tractor. Still more particularly, the invention relates to an improved forward body construction for a tractor. The invention has for a principal object the improvement in forward body structure, to the end that a rigid support carried on the front part of the body, such as by being connected to the forward portion of the power plant, serves to carry the tractor front wheels, the radiator for the power plant, and a protective element disposed ahead of the radiator. A feature of the invention resides in the construction of the protective element as a relatively heavy-duty rectangular frame which not only serves as a guard, but functions as a bumper as well as means for utilizing certain implement attachments when implements are employed with the tractor. The protective frame further incorporates a grille work, and another feature is the location of head lamps behind and protected by the grille work.

It is a significant object of the invention to provide an improved mounting means for the protective element, especially one in which the element is mounted at its lower portion on a rigid support part for tilting when necessary about a transverse axis, in connection with which subsidiary features reside in improved brace means for connecting lower portions of the protective element to side frame members of the body, and means for sustaining a forward portion of the hood on a rearward extension of the protective element. To augment the rearward tiltability of the protective element, the connections between the element and the frame members, brace means and hood are made yieldable to permit limited rearward rocking of the element. In this regard, the construction features an arrangement in which shocks imposed on the element are not transmitted directly to either the radiator or the power plant. A secondary feature along these lines resides in the utilization of the implement-attachment means on the protective element in association with other parts of the tractor whereby an implement, such as a material-handling loader or the like, may be mounted on the tractor in such manner that loads imposed on the implement are taken in part by the relatively heavy protective element and in part by the rear axle structure of the tractor, thereby relieving intermediate portions of the tractor of implement load.

The foregoing and other important objects and desirable features inherent in and encompassed by the invention will become apparent as a preferred embodiment thereof is disclosed in detail in the ensuing specification and accompanying sheets of drawings, the several figures of which are described below.

Fig. 6 is a longitudinal section as seen generally along the line 6—6 of Fig. 4.

Fig. 7 is an enlarged section as seen along the line 7—7 on Fig. 1.

Fig. 8 is a side elevation, with portions broken away, showing a typical material-handling implement mounted on the tractor of Fig. 1.

Fig. 9 is an enlarged section on the line 9—9 of Fig. 8.

Figure 1:
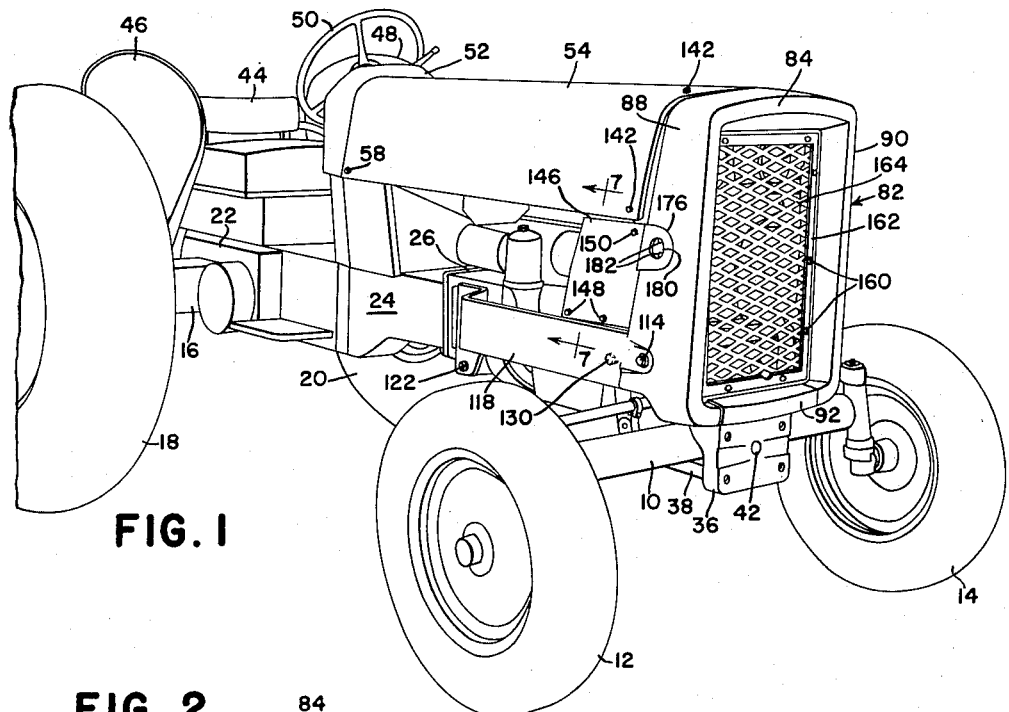
Fig. 1 is a perspective of the tractor.

The fore-and-aft tractor body, the components of which will be described subsequently, is supported at its front end on a transverse front axle 10 which in turn is carried on right and left hand front wheels 12 and 14; the body is carried at its rear end on transverse rear axle structure 16 which is in turn supported on right and left hand rear traction wheels 18 and 20. The tractor body comprises a rear body part made up of a transmission and final drive housing 22, an intermediate housing 24 and a power plant 26, all of which are rigid structures rigidly interconnected in any suitable manner, cap screws being representative of a typical fastener means in structures of this nature. The fore part of the tractor is further augmented by a rigid support 28 which is rigidly secured as by a plurality of cap screws 30 to a front upright transverse wall portion 32 of the power plant 26. The support 28 includes a rear transverse wall portion 34 and a front transverse wall portion 36, the two being bridged by a lower fore-and-aft web 38 and being rigidly joined at their upper portions by a transverse main structural part 40. The wall 34 is that portion of the support through which the cap screws 30 are passed for rigidly connecting the same to the front wall 32 of the power plant 26. The bridging portions 38 and 40 afford an opening through which the transverse front axle 10 extends, and the walls 34 and 36 are apertured in alinement to receive a fore-and-aft pin 42 for establishing a fore-and-aft axis about which the front axle structure is adapted to oscillate when the wheels adapt themselves to varying ground contour.

To the extent described, the tractor body comprises the rigidly united fore-and-aft components 22, 24, 26 and 28. The rear part of the tractor is supplemented by an operator's seat 44, of typical construction, situated between right and left hand fenders 46 and 48 and behind a steering wheel 50 which is mounted on a console 52 which serves as a rear mounting or supporting means for a fore-and-aft hood 54 which extends forwardly from the console and overlies the power plant 26 as well as a coolant radiator 56 positioned ahead of the power plant 26 in the usual fashion, except for mounting details to be noted below. Any type of fasteners, such as that indicated at 58, may be used to connect the rear portion of the hood 54 to the console or support 52.

An upper rear portion of the support 28 carries rear transverse pivot means in the form of a pair of coaxial rods 60 and 62 which support a lower portion of the radiator 56, the latter having forwardly projecting brackets 64 and 66 thereon which are received respectively by the rods 60 and 62. The radiator 56 rises from the supporting points just noted and has at an upper portion thereof a rigid transverse bar 68 which is connected by a bracket 70 to a forward upper portion of the power plant 26. Thus, the radiator is supported at the forward portion of the tractor but is clear of the hood 54.

Figure 5:
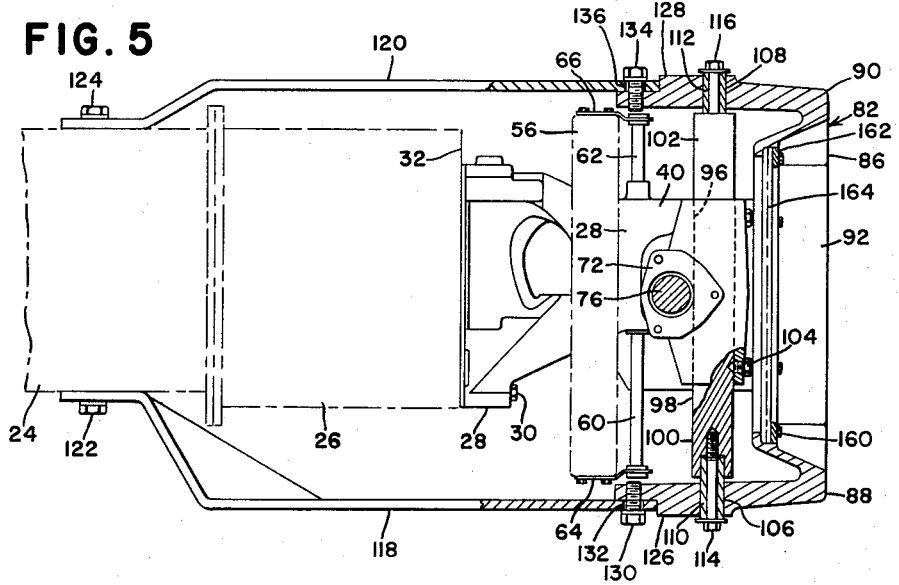
Fig. 5 is a section as seen generally along the line 5—5 of Fig. 2, again employing broken lines to indicate major components whose details are not per se significant.

An additional function of the support 28 is to support part of the mechanism for steering the front wheels 12 and 14. For this purpose, an intermediate portion of the upright rigid part 40 of the support rises as a standard 12 and has a continuation standard part 74 bolted or otherwise secured thereto for housing a vertical steering shaft or spindle 76 (Fig. 5). The upper part of the standard part 72—74 terminates in a gear box 78 to which the steering wheel 50 may be connected via an input shaft 80. The connection between the steering wheel and the shaft 80 is immaterial in the present case and may be a direct mechanical connection or may even incorporate power means for embodying power steering in the tractor.

Another and significant function of the support 28 is its mounting of a frontal protective element 82. This element is in the form of a relatively heavy casting, affording a rectangular frame disposed in a tranverse upright plane and having a top 84, a transverse bottom 86, and right and left hand upright sides 88 and 90. The bottom is supplemented by an insert 92 which is removably held in place from the rear by cap screws 94 (Fig. 6). The insert is shown as removed in Fig. 2 and in place in Figs. 1, 5 and 6. For purposes of the present invention, the insert may be ignored.

The support 28 has therein, just ahead of the axis of the radiator support rods 60 and 62, a transverse bore 96 which receives a pivot member 98 that has opposite right and left hand ends 100 and 102 projecting respectively laterally outwardly beyond opposite sides of the support. Set screws, as at 104 (Fig. 5) center and mount the pivot member 98. Lower portions of the protective element 82 are apertured in alinement, as at 106 and 108, to receive tubular dowels 110 and 112 which are recessed in the respective ends of the member 98, a typical construction being shown at the right hand end 100 of the member in Fig. 5. In addition to being bored to receive the inner ends of the dowels, the opposite ends of the member 98 are tapped to respectively receive right and left hand cap screws 114 and 116. These cap screws may be drawn up tight without clamping the sides of the element 82. Consequently, the element 82 is mounted on the member 98 for fore-and-aft tilting about the axis of the member; although, the element is normally held in a substantially fixed position by supporting and brace means to be presently described, it being expected that the element will yield only when subjected to impact or other extreme loads, which can be accepted by the element without damage to the radiator, power plant and hood, for example.

The fore-and-aft body of the tractor is complemented by right and left hand fore-and-aft frame members 118 and 120 respectively. These members respectively have rear ends that are rigidly secured as at 122 and 124 to opposite sides of the body part, particularly the housing 24 that lies intermediate the power plant 26 and transmission case 22. The forward ends of the members extend in proximity to rearward extensions 126 and 128 respectively integral with lower side portions of the protective element 82. The forward end of the right hand frame member 118 is connected to the element extension 126 by a single cap screw 130, and the end of the frame has a relatively large aperture 132 for loosely receiving the cap screw 130. Therefore, the connection of the frame member 118 to the extension 126 is largely a frictional connection; that is, the slot or larger opening 132 permits yielding between the element 82 and frame member 118 in the event that the element 82 is tilted rearwardly, as by a force imposed against its upper end. A similar relationship exists between the left hand extension 128 on the element and the front end of the left hand frame member 120, a cap screw 134 being employed and the front end of the frame member 120 having a slot or relatively large opening 136 through which the cap screw passes.

The element 82 includes an upper rearward extension in the form of an integral web 138 which is apertured at 140 to receive cap screws 142 through the front marginal edge portion of the hood 54. As will be apparent from Fig. 1, the upper marginal web extends downwardly to at least a mid-point of each side of the element so that the hood, which is of inverted U-shape, may be secured at its lower front sides as well as at its upper portions. Although not illustrated in detail, the apertures through the hood, which receive the cap screws 142, are enlarged over the outside diameters of the cap screws, similar to the construction at 130—132, to afford a yielding connection between the hood 54 and the element 82, whereby these connections will yield when the element is moved rearwardly about the pivot axis of the member 98.

In addition to the yielding connections already described, as between the frame members 118 and 120 in the element 82 and between the element 82 and the hood 54, further brace means are provided. The right hand one of these is illustrated in detail, particularly in Figs. 1 and 7 and therefore will be described. As best shown in Fig. 7, the right hand fore-and-aft frame member 118 has rigidly secured thereto a pair of tapped ears 144 by means of which the lower marginal edge portion of a right hand brace 146 is mounted, cap crews 148 being used. As seen in Fig. 1, the brace 146 is of rectangular shape and is preferably formed of medium gauge sheet metal and, in addition to being secured to the frame member 118 by the cap screws 148, is secured by a cap screw 150 to a depending portion of the element marginal web 138. Fig. 7 illustrates, as does Fig. 1, the additional function of the brace 146 as lending itself to the appearance of the tractor, since it is angled inwardly to form a pleasing junction with the lower marginal edge of the hood 54. The structure is repeated symmetrically at the left hand side of the tractor, and it will suffice to note that a left hand brace 152 is mounted on the frame member 120 by cap screws 154 and is further joined to the left hand depending portion of the hood 54. Here again the apertures through the braces 146 and 152 through which the associated cap screws are passed are of enlarged diameter so as to afford a yielding connection, whereby the connections may give when the protective element 82 is subjected to rearward loads applied to portions above the pivot axis of the member 98. Normally these loads would be encountered by the element 82 when operating primarily as a bumper and therefore would be generally at the level of the pivot member 98, which would entail little if any tilting of the element 82. However, in those cases in which an extreme upper portion of the element 82 encounters an obstacle, such as the side of a truck being loaded when the tractor is equipped as in Fig. 8, the various yielding connections just described can perform as intended and thus eliminate the transmission of unusual loads to the tractor frame or its components, particularly those parts constructed as castings and secured together by cap screws.

The element 82 is provided with an inner marginal flange 156, and this flange has a plurality of tapped bores, as at 158, for receiving cap screws 160 which mount an inner rectangular frame 162 to the backside of which is welded or otherwise secured a perforated grille 164. In the instance shown, the grille is of expanded metal, although it may be of any other construction. The grille and frame are readily removable from the front of the element 82 for access to the interior structure.

Figure 2:
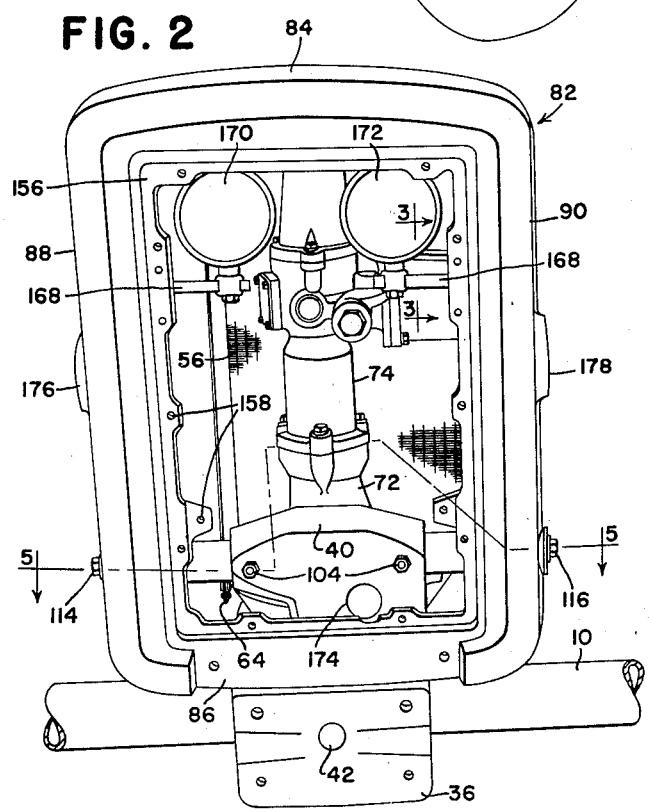
Fig. 2 is an enlarged front perspective, with portions omitted, and with the protective grille removed to expose structure behind the plane of that grille.
Figure 3:
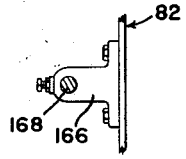
Fig. 3 is a slightly enlarged section as seen on the line 3—3 of Fig. 2.
Figure 4:
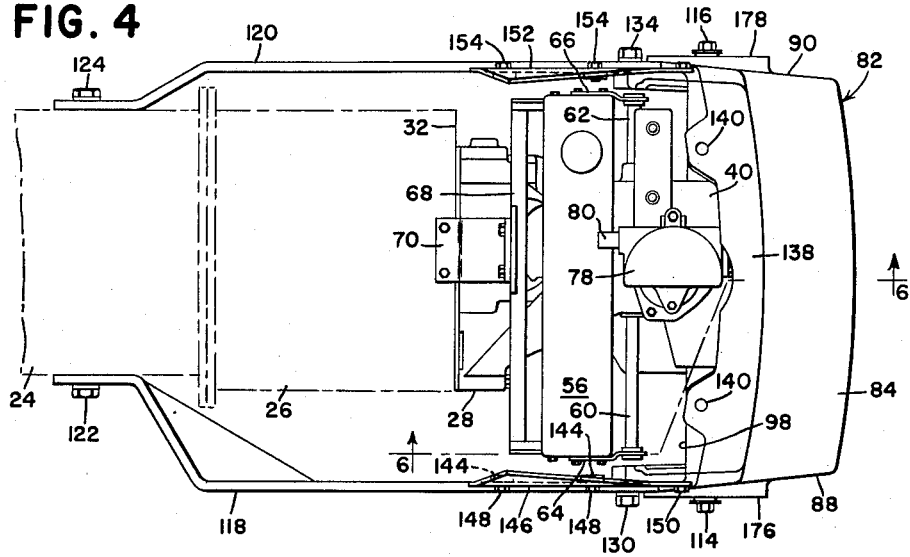
Fig. 4 is a plan of the forward portion of the tractor, with the hood removed, and with certain portions of the tractor body and power plant indicated in broken lines.

The element 82 has at each side thereof, along its rear edge, a mounting bracket 166 in which is adjustably supported a transverse mounting rod 168. These rods mount right and left hand headlamps 170 and 172 (Fig. 2). Thus the headlamps are disposed in a protected zone within the marginal confines of the element 82 and rearwardly of the protective grille 164.

The front support 28 has a fore-and-aft opening 174 therethrough which is adapted to receive a starting crank for the power plant 26, and this opening also provides access to the forward end of the crank shaft for a front power take-off if desired.

A still further function of the element 82 is its capacity to serve as means for mounting certain types of implements on the tractor. For this purpose, opposite sides of the element have implement attaching portions or mounts 176 and 178. The right hand one of these (176) is best shown in Fig. 9, wherein it is clear that the mounting portion is in the form of a boss having a dowel-receiving pocket 180 and a pair of tapped bores 182 within the confines of the pocket 180. The structure is identical at both sides of the element 82.

Fig. 8 illustrates one type of implement mountable on the tractor by means of the mounting portions 176 and 178 and other mounting components on the tractor. The implement illustrated is a material-handling loader comprising essentially a base frame made up of right and left hand rigid supporting frames, only the right hand one of which is shown at 184. It will be understood that the frame structure is the same at both sides; hence, the description of the frame 184 will suffice for both sides of the implement.

The tractor rear axle structure 16 carries at each side thereof a rear support 186, and this support is rigid on the axle. It extends forwardly and has a transverse pivot 188 which carries the rear horizontal frame part 190 of the frame 184. The frame 184 is in the form of a distorted Y of which the frame part 190 forms one leg. One arm of the Y is established by a forwardly and upwardly inclined rigid frame part 192 which is connected to the right hand front implement attaching portion 176. The other arm of the Y is established by a rigid upright 194. The three frame parts 190, 192 and 194 are rigidly interconnected to form a unitary structure.

The extreme front end of the arm 192 is apertured to receive a dowel 196 which is received in part in the pocket 180 of the attaching portion 176 and which is provided with a pair of through apertures for receiving cap screws 198 which are threaded into the bores 182 in the element 82. A pivotal mounting is thus effected. Therefore, the frame 184 is pivotally mounted at its front end at 176 and at its rear end at 188.

The upper portion of the upright arm 194 of the loader frame 184 has a transverse pivot pin 200 on which is mounted the rear end of a boom arm 202. A typical loader bucket 204 is carried at the front end of the arm 202. It will be clear that there is a similar arm similarly mounted at the other side of the tractor. A hydraulic ram 206 is connected at one end 208 to an intermediate portion of the boom arm 202 and at its other end to a mid portion of the frame 184 at 210, and is expandible and contractable to raise and lower the arm 202. A bucket control ram 212 is typically arranged to control the bucket 204, which pivots at 214 on the front end of the boom arm 202.

When the implement is mounted on the tractor, the element 82 not only supports the forward ends of the frames 184 but the frames in turn support or are in force-receiving relationship to the element. Thus, the loader frames are supported at their front and rear ends on front and rear portions respectively of the tractor. Therefore, forces imposed on the loader are taken by the front and rear ends of the tractor and are diverted from intermediate portions of the tractor, which is important when it is considered that the basic body components of the tractor are castings and the frames 184 are steel. Therefore, the danger of breaking tractor castings or imposing undue loads on the interconnecting cap screws is avoided.

It will be clear from the foregoing description that the element 82 has many functions. It is supported at the forward end of the tractor in a novel manner and such as to achieve the objects already outlined. Other objects and features will readily occur to those versed in the art, as will many modifications and alterations in the preferred embodiment of the invention illustrated, all of which may be achieved without departure from the spirit and scope of the invention.

What is claimed is:

1. In a tractor or the like, comprising: a rigid rearward body part; a power plant rigidly secured to said part and extending forwardly therefrom to a terminal front portion; a rigid support rigidly secured to and projecting ahead of said front portion; an upright transverse radiator disposed ahead of the power plant; means sustaining a lower part of the radiator on the support; means mounting an upper portion of the radiator to the power plant; a transverse upright protective element disposed ahead and independent of the radiator; transverse pivot means mounting a lower part of the element on the support; a pair of transversely spaced apart fore-and-aft frame members respectively at opposite sides of and independent of the support, radiator and power plant and having front ends respectively adjacent to lower side portions of the element and rear ends respectively at opposite sides of the rearward body part; means rigidly securing said rear ends to the rearward body part; front securing means connecting said frame member front ends respectively to said lower side portions of the element; brace means connecting the frame members to the protective element at portions of said element above said front securing means; and said front securing means and brace means being capable of limited yielding responsive to rearward tilting of the element about the transverse pivot means.

2. The invention defined in claim 1, including; hood means overlying the power plant and radiator and having front and rear ends respectively proximate to the rearward body part and an upper portion of the element; rear means sustaining the rear end of the hood on the rearward body part; and yieldable front means connecting the front end of the hood to said upper part of the element and capacitated to yield upon the aforesaid rearward tilting of said element.

3. In a tractor or the like, comprising; a rigid rearward body part; a power plant rigidly secured to said part and extending forwardly therefrom to a terminal front portion; a rigid support rigidly secured to and projecting ahead of said front portion; a transverse upright protective element disposed ahead and independent of the power plant; transverse pivot means mounting a lower part of the element on the support; a pair of transversely spaced apart fore-and-aft frame members respectively at opposite sides of and independent of the body and power plant and having front ends respectively adjacent to lower side portions of the element and rear ends respectively at opposite sides of the rearward body part; means rigidly securing said rear ends to the rearward body part; front securing means connecting said frame member front ends respectively to said lower side portions of the element; brace means connecting the frame members to the protective element at portions of said element above said front securing means; and said front securing means and brace means being capable of limited yielding responsive to rearward tilting of the element about the transverse pivot means.

4. In a tractor or the like including a fore-and-aft body having front wheel means and further having rear wheel means supporting a rear part of the body, the improvement comprising: a front support rigidly secured to a fore part of the body in overlying relation to the front wheel means and having means for mounting on the front wheel means, said support having opposite sides and a transverse bore therethrough opening at opposite ends respectively at said sides; a pivot member carried in the bore and having opposite ends projecting laterally respectively beyond said opposite sides; an upright transverse element having lower side parts respectively proximate to the projecting ends of the pivot member, said element rising from said lower side parts and said side parts respectively having rearward extensions thereon rearwardly of the axis of the pivot member; means mounting the element side parts respectively on the ends at the pivot member; means interconnecting the rearward extensions and the rear part of the body; and yielding brace means connecting the element to the body to normally restrain the element against fore-and-aft rocking about the axis of said pivot member.

5. In a tractor or the like including a fore-and-aft body, the improvement comprising: a front support rigidly secured to a fore part of the body and having a transverse bore therethrough; a pivot member carried in the bore and having opposite ends projecting laterally respectively beyond opposite sides of the support; an upright transverse element having a lower part mounted on the projecting ends of the pivot member and rising therefrom and including a pair of rearward extensions on the lower part of and rigid with said element, one at each side of the body; a pair of fore-and-aft frame members, one at each side of the body, having their rear ends connected to the body and their front ends connected respectively to said extensions; and yielding brace means connecting the element to the body to normally restrain the element against fore-and-aft rocking about the axis of said pivot member.

References Cited in the file of this patent

UNITED STATES PATENTS

| | | |
|---|---|---|
| 1,142,456 | Pothier | June 8, 1915 |
| 1,544,858 | Patten | July 7, 1925 |
| 1,574,102 | McGregor | Feb. 23, 1926 |
| 2,325,729 | Allin | Aug. 3, 1943 |
| 2,375,801 | Le Tourneau | May 15, 1945 |
| 2,399,733 | Hagen | May 7, 1946 |
| 2,431,495 | Mosser | Nov. 25, 1947 |
| 2,468,809 | Brock et al. | May 3, 1949 |
| 2,576,316 | Toth | Nov. 27, 1951 |

FOREIGN PATENTS

| | | |
|---|---|---|
| 104,247 | Great Britain | Mar. 1, 1917 |